(12) United States Patent
Pudipeddi et al.

(10) Patent No.: US 10,007,561 B1
(45) Date of Patent: *Jun. 26, 2018

(54) MULTI-MODE DEVICE FOR FLEXIBLE ACCELERATION AND STORAGE PROVISIONING

(71) Applicant: BiTMICRO Networks, Inc., Fremont, CA (US)

(72) Inventors: Bharadwaj Pudipeddi, San Jose, CA (US); Jeffrey Bunting, Albany, CA (US); Lihan Chang, San Jose, CA (US)

(73) Assignee: BiTMICRO Networks, Inc., Fremont, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/483,893

(22) Filed: Apr. 10, 2017

Related U.S. Application Data

(60) Provisional application No. 62/441,248, filed on Dec. 31, 2016, provisional application No. 62/371,888, filed on Aug. 8, 2016.

(51) Int. Cl.
  *G06F 9/46* (2006.01)
  *G06F 9/50* (2006.01)
(52) U.S. Cl.
  CPC .................. *G06F 9/5083* (2013.01)
(58) Field of Classification Search
  CPC ................................... G06F 9/5083
  USPC ...................................... 718/105
  See application file for complete search history.

(56) References Cited

U.S. PATENT DOCUMENTS

| | | | |
|---|---|---|---|
| 6,094,443 A | 7/2000 | Dwork | |
| 6,151,681 A * | 11/2000 | Roden | G06F 1/3203 |
| | | | 713/322 |
| 6,745,305 B2 | 6/2004 | McDowell | |
| 8,386,433 B1 | 2/2013 | Kadayam | |
| 9,037,671 B2 | 5/2015 | Weber et al. | |
| 9,537,710 B2 | 1/2017 | Shankar et al. | |
| 9,582,383 B2 | 2/2017 | Fagiano et al. | |
| 2003/0105931 A1 | 6/2003 | Weber et al. | |
| 2004/0088505 A1 | 5/2004 | Watanabe | |
| 2007/0157206 A1* | 7/2007 | Rakvic | G06F 9/4893 |
| | | | 718/102 |
| 2008/0052708 A1* | 2/2008 | Zhong | G06F 13/4027 |
| | | | 718/1 |
| 2011/0289519 A1* | 11/2011 | Frost | G06F 8/456 |
| | | | 719/328 |

(Continued)

OTHER PUBLICATIONS

Office Action dated Sep. 28, 2017 for U.S. Appl. No. 15/396,557.

(Continued)

*Primary Examiner* — Qing Chen

(57) ABSTRACT

The invention is an apparatus for dynamic provisioning available as a multi-mode device that can be dynamically configured for balancing between storage performance and hardware acceleration resources on reconfigurable hardware such as an FPGA. An embodiment of the invention provides a cluster of these multi-mode devices that form a group of resilient Storage and Acceleration elements without requiring a dedicated standby storage spare. Yet another embodiment of the invention provides an interconnection network attached cluster configured to dynamically provision full acceleration and storage resources to meet an application's needs and end-of-life requirements of an SSD.

30 Claims, 6 Drawing Sheets

Peripheral Element (PE) with Controller Element (CE) and its internals showing the modules.

(56) References Cited

U.S. PATENT DOCUMENTS

| | | | |
|---|---|---|---|
| 2014/0215277 A1* | 7/2014 | Judd | G06F 11/2284 |
| | | | 714/42 |
| 2015/0312337 A1 | 10/2015 | Keremane | |
| 2016/0085718 A1 | 3/2016 | Huang | |
| 2016/0364271 A1* | 12/2016 | Burger | G06F 9/5027 |
| 2016/0373416 A1* | 12/2016 | Burger | G06F 21/72 |
| 2016/0378568 A1* | 12/2016 | Knox | G06F 9/5083 |
| | | | 718/105 |

OTHER PUBLICATIONS

NVMe Direct, Feb. 2016, QLogic, pp. 1-5.
Office Action dated Jan. 26, 2018 for U.S. Appl. No. 15/396,557.
Advisory Action dated Apr. 12, 2018 for U.S. Appl. No. 15/396,557.

* cited by examiner

System with CPU nodes (X0 and X1), interconnect (PN0), and Peripheral Elements (PE0 to PEn)

Figure 2 (a): Peripheral Element (PE) with Controller Element (CE) and its internals showing the modules.

Figure 2 (b): Provisioned Acceleration Modules can be dynamically swapped with Provisioned ECC modules based on the mode (primary being SSD or Acceleration).

Setup: RaidGroup with SSDs (PE0 to PEn-1) and 1 Spare+Accel (PEn)

Protected Failure without Standby

Post-Failure of PE1: RaidGroup with n-1 SSD

Protected Failure without Standby

MULTI-MODE DEVICE FOR FLEXIBLE ACCELERATION AND STORAGE PROVISIONING

CROSS-REFERENCE(S) TO RELATED APPLICATION

This application claims the benefit of and priority to U.S. Provisional Applications 62/371,888 and 62/441,248. The U.S. Provisional Applications 62/371,888 and 62/441,248 are hereby fully incorporated herein by reference.

FIELD

Embodiments of the invention relate generally to the field of Hardware Acceleration of a certain class of software algorithms whose outcomes are approximate, and storage technologies (flash memory in particular).

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

Server CPUs (Central Processing Units) have a number of directly integrated high performance PCI-e (Peripheral Component Interconnect Express) links for direct-attached devices. The performance benefits for a direct attached interface are especially important for devices such as SSDs (solid state drives) and hardware accelerators, because these devices require high throughputs and low latencies. However, current solutions for deploying direct-attached devices, for example, at a large scale in data centers, are inefficient due to a combination of factors: limited scalability of CPU links (up to 10 devices per CPU), internal CPU throughput (up to 64 GB/second), and the external switching network to support multiple devices. There is also perhaps a more important factor to scaling - the prohibitive cost and power inefficiency of deploying direct-attached devices.

Therefore, there is a continuing need to overcome the constraints or disadvantages of conventional systems.

SUMMARY

Embodiments of the invention provide a system and method to vastly enhance the overall utilization of a server by creating a distributed cluster from all the PCI-e links available inside a server or a server-attached expansion unit. In one of its forms or embodiment, this invention also uses NVMe (Non-Volatile Memory Express) to exploit parallelism with low overhead.

An embodiment of the invention is a new class of device designed for high-performance interconnects such as (PCIe, Omnipath, 100 GbE (Gigabit Ethernet) among others) with multiple modes for dynamic provisioning in a cloud data center. This feature enables large scale deployment in virtualized data centers where the same server needs to be configured for different application needs. Another example application for this invention is the ability to swap modes between different devices for consistent performance and longer lifetime, as sub-components within a device wear out and fail.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

Figure 1:
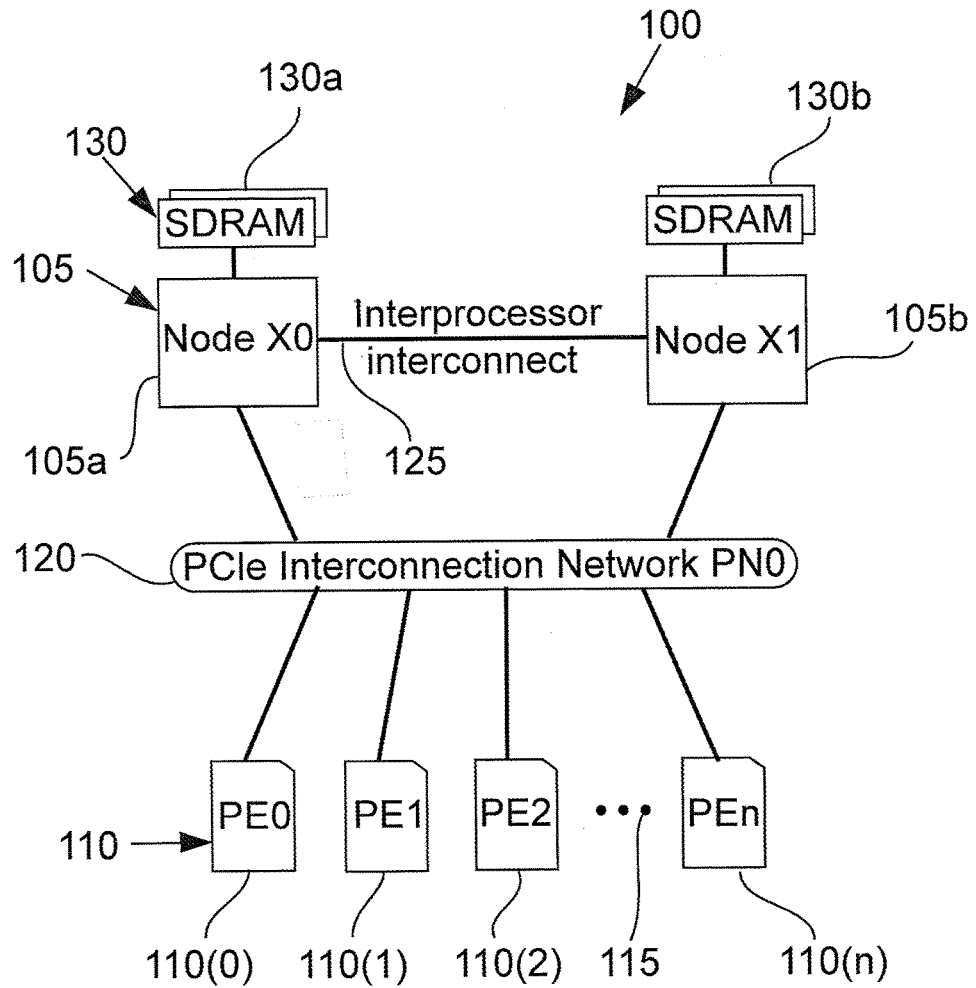
FIG. 1 is a block diagram of a common dual-socket server, wherein the server has two Central Processing Units (CPUs) and connects to a set of peripheral elements via an interconnection network.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

Embodiments of the invention provide a system and method to vastly enhance the overall utilization of a server by creating a distributed cluster from all the PCIe links available inside a server or a server-attached expansion unit. In one of its forms or embodiment, this invention also uses NVMe to exploit parallelism with low overhead.

An embodiment of the invention is a new class of device designed for high-performance interconnects such as (PCIe, Omnipath, 100 GbE, infiniband, among others) with multiple modes for dynamic provisioning in a cloud data center. This feature enables large scale deployment in virtualized data centers where the same server needs to be configured for different application needs. Another example application for this invention is the ability to swap modes between different devices (e.g., different peripheral elements) for consistent performance and longer lifetime, as sub-components within a device (e.g., peripheral element) wear out and fail.

FIG. 1 is a block diagram that shows a common dual-socket server 100 with two CPUs 105*a* and 105*b* (the elements X0 and X1, respectively) and connecting to a set 110 of peripheral elements 110(0), 110(1), 110(2) through 110(n) (peripheral elements PE0, PE1, PE2 through PEn, respectively) via a direct PCIe interconnection network (PNO) 120. The number of peripheral elements 110 (that are coupled to the interconnection network 120) may vary in number as shown by dot symbols 115. In server CPU architectures, this interconnection network 120 would typically be PCIe network. The peripheral elements PEs 110 in this case would be SSDs, hardware accelerators, and NVRAMs (non-volatile random access memories). These devices may in fact be hot swappable. Their form factor could be variant. The server network (PNO) 120 itself might simply be a switch or just pass-thrus (e.g., repeaters and/or splitters). Also, part of or a whole of the network (PNO) 120 and the peripheral elements (PEs) 110 may be housed within or outside the server chassis. If the above-noted elements are outside the server chassis, they would be connected to the server chassis by external cabling (not shown in FIG. 1).

The CPU nodes 105*a* and 105*b* are coupled together by an interprocessor interconnect 125. Additionally, one or more memory devices such as an SDRAM (synchronous dynamic random access memory) 130 may be coupled to a given CPU node 105. For example, one or more SDRAMs 130*a* are coupled to the CPU node 105*a* and one or more SDRAMs 130*b* are coupled to the CPU node 105*b*.

Figure 2A:
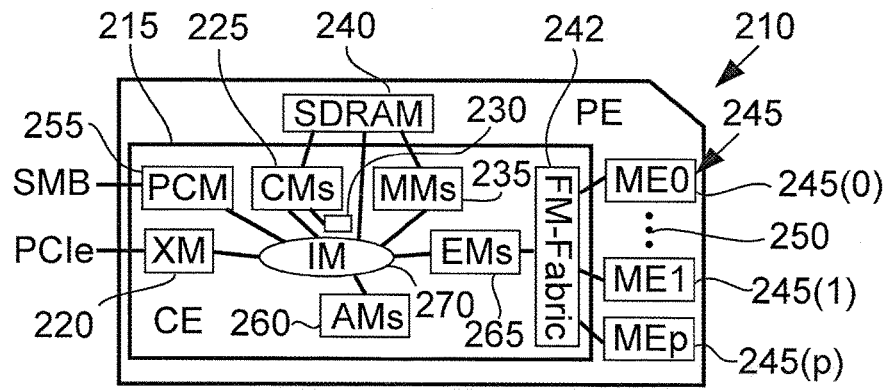
FIG. 2A is a block diagram that shows various modules of a peripheral element, in accordance with an embodiment of the invention.

The central idea in an embodiment of the invention is to create a multi-mode device (see, e.g., multi-mode device 210 or peripheral element 210 in FIG. 2A) that can be configured as an SSD or NVRAM or Hardware Accelerator at any particular time. A given multi-mode device may in fact be two or more of the above-noted configurations at the same time, as also discussed below in additional details. For example, a given multi-mode device may be an SSD and NVRAM at the same time, or, as another example, a given multi-mode device may be an SSD and hardware accelerator. Other possible combinations of the above-noted configurations are possible for a given multi-mode device. The modality of a multi-mode device is configured on the fly by software from a provisioning tool.

The idea in an embodiment of the invention is based on the need to create power-efficient cloud clusters that can be transformed from computing nodes to data processing nodes and vice-versa without requiring the user to deploy separate resources.

Modern storage elements, in particular, SSDs and NVRAMS, have computational, memory, and storage functionalities, and therefore, modern storage elements would be an ideal representation of these peripheral elements. Hardware accelerators share many similarities although there is more need for computational engines (or hardware kernels) over storage control.

An embodiment of invention is a unified architecture that enables storage and computation engines within a controller to dynamically share the space. An ideal implementation would be using an FPGA (Field Programmable Gate Array) where partial reconfiguration can be used to increase acceleration with decreased storage performance IOPs (as in input-output operations per second) or increased performance IOPs with decreased acceleration. The same architecture for an ASIC (application specific integrated circuit) would trade off engines for consistent power. Similar to Voltage/Frequency scaling in processors, this is a scaling between storage performance and hardware acceleration under a power budget.

Discussed below are three different embodiments or aspects of the invention. These different embodiments, taken as a whole, create an enterprise-class highly dense mini-cluster that is optimized for performance, and can be built to withstand even server-level failures.

Figure 2B:
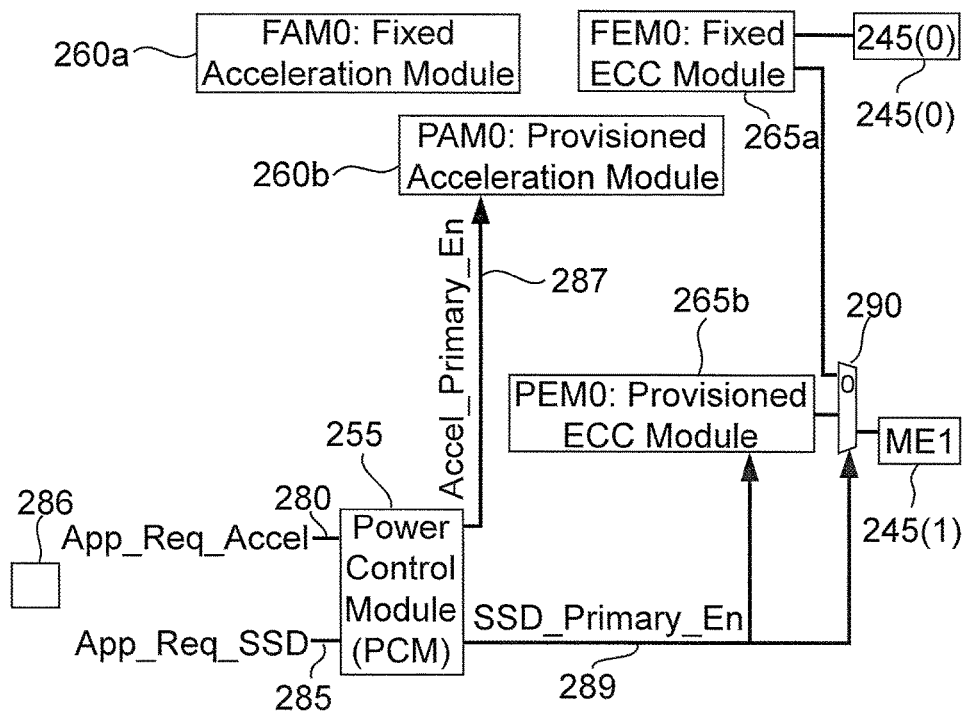
FIG. 2B is a block diagram showing a provisioned acceleration module that can be dynamically swapped with a provisioned storage module (e.g., ECC module or flash controller module or non-volatile memory controller) based on the mode of the peripheral element, in accordance with an embodiment of the invention.

FIGS. 2A and 2B are block diagrams showing various features of a peripheral element (PE) 210, in accordance with an embodiment of the invention. Examples of the peripheral element 210 is shown as peripheral elements PE0, PE1, PE2 through PEn-1 and PEn in the server SE0 in FIG. 3A. In particular, FIG. 2A is a block diagram of the modules in a peripheral element 210 and also FIG. 2B is a block diagram illustrating provisioned acceleration modules that can be dynamically swapped with provisioned storage modules (e.g., ECC (error correcting code) modules) based on the mode of the peripheral element (PE).

An embodiment of the invention provide a system and a method for a peripheral element (PE) 210 to be dynamically configured for an application's needs for storage performance and hardware acceleration. Therefore, the system and method provide flexible acceleration and storage provisioning as discussed below in additional details. In one embodiment of the invention, a multi-mode device comprises storage elements and acceleration elements that can be dynamically configured for load-balancing between various levels of storage functionality and hardware acceleration. The multi-mode device can be, for example, an FPGA (field programmable gate array) device, an ASIC (application specific integrated circuit) device, a programmable SoC (system on a chip), or another suitable device type. The storage elements can be, for example, non-volatile memory devices such as flash memory, 3D XPoint, MRAM (magnetoresistive random access memory), or other suitable types of non-volatile memory devices. The acceleration elements can be, for example, DDR4 SDRAM (double data rate fourth generation synchronous dynamic random access memory) devices or high bandwidth memory devices.

In the example above, the storage elements and acceleration elements are in dynamic proportion. As another example, the storage elements and acceleration elements are in fixed proportion instead of dynamic proportion such as in an ASIC (Application Specific Integrated Circuit).

FIG. 2A shows the internals of a peripheral element (PE) 210 highlighting the various modules within that are typically required to implement functionality such as an SSD controller and Hardware Accelerators. The following elements in the peripheral element 210 are now discussed.

The peripheral element 210 has a central chip called the Controller Element (CE) 215 that interfaces to a host, on-board memory, and/or a storage media. In the controller element (CE) 215 is the external interface module (XM) 220 which is typically PCIe. There are CPU modules (CMs) 225 in the controller element 215 and there are multiple of the CPU modules 225 to run embedded firmware 230. The controller element 215 also has memory management modules (MMs) 235 to connect to one or more external SDRAMs 240 and also has a fabric control module (FM) 242 to connect to non-volatile media such as flash memory. In the example of FIG. 2A, the fabric control module 242 is coupled to one or more non-volatile media (media element) 245. The number of media elements 245 can vary in number as symbolically shown by dot symbols 250. For example, only one media element (ME0) 245(0) is coupled to the fabric control module 242. In another example, two or more media elements 245 (e.g., ME0 245(0) through ME1 245(1) or ME0, ME1, through MEp 245(p)) are coupled to the fabric control module 242.

The following modules can also be provisioned or included in the peripheral element 210. For example, the peripheral element 210 can include a power control module 255 which is special configuration module and will be discussed further below. The peripheral element 210 can include one or more acceleration modules (AMs) 260 and/or one or more storage modules (EMs) 265 (e.g., ECC modules or flash controller modules or non-volatile memory controller) to be discussed further below.

Also, the EM modules 265 in FIG. 2A can instead be a storage modules 265, and the EM modules 265a and 265b in FIG. 2B can instead be storage modules 265a and 265b, respectively, wherein a storage module can be, for example, an ECC (error correcting code) module or a flash controller module.

The controller element 215 also includes an interface module (IM) 270 that is coupled to the various elements in the controller element 215 such as XM 220, CMs 225, MMs 235, PCM 255, AMs 260, and/or Ems 265.

The flexibility inherent in the architecture of FIG. 2A can be broadly applied to both SSD and hardware acceleration. But the two modes required to balance each other are based from an application's requirements, as will be discussed below in various examples.

In an embodiment of the invention, a method is provided for the peripheral element 210 to create a QoS (Quality of Service) feature with the application for provisioning the storage performance and acceleration performance. The word "application" herein broadly applies to any software layer running on a host or client (if connected via a network fabric instead of PCIe). The requests sent by an application are discussed below with reference to an application 286 in FIG. 2B.

In an embodiment of the invention, a method and apparatus are provided wherein there are multiple storage modules (an ECC module and flash controller module would be the typical examples storage modules) of which some number (from 0 to k) of the multiple storage modules are fixed. The rest of the storage modules can be turned on or off or swapped out altogether. An example of the ECC module or flash controller module is shown as EM 265 in FIG. 2A. Similarly, there are multiple acceleration modules of which some number (0 to m) of the multiple acceleration modules are fixed and the rest of the acceleration modules can be turned on or off or swapped out altogether. An example of the acceleration module is shown as AM 260 in FIG. 2B.

In this embodiment of the invention, the peripheral element 210 comprises the following features:

(a) a virtual or physical entity called a PCM (Power Control Module) 255 that is able to turn on and off the provisional modules to meet the power and QoS requirements, and (b) the ability for the controller element (CE) 215 to access all storage media with just even one fixed storage module (i.e., wherein the multi-mode device 210 comprises a controller element 215 that accesses all storage media even if the multi-mode device 210 has ONLY one fixed storage module).

The power control module (PCM) 255 is a special configuration module that may exist in hardware or purely as a firmware routine running on CMs 225 (embedded CPU modules). The power control module 255 is coupled to a communication link (or can be controlled via a communication link) such as, for example, a system management bus (SMB).

Therefore, in one embodiment, the multi-mode device 210 comprises an on-board or on-chip PCM (Power Control Module) 255 that is able to dynamically provision storage and acceleration modules and/or turn the storage and acceleration modules on or off.

FIG. 2B is a block diagram showing an example of the above discussed embodiment of the invention. In this example, the CE 215 has one fixed storage module (FEM0) 265a and one provisional storage module (PEM0) 265b. The storage module 265a and/or storage module 265b can be an ECC module or a flash controller module. The CE 215 also has one fixed acceleration module (FAM0) 260a and one provisional acceleration module (FAM0) 260b. This example is relevant since ECC modules and acceleration modules are both typically quite large and consume significant power.

In FIG. 2B, the PCM 255 of controller element 215 is shown as configured to receive the application request acceleration signal (App_Req_Accel) 280 and application request SSD signal (App_Req_SSD) 285. An application 286 can request the PCM 255 to provide more acceleration (via request acceleration signal 280) or can request the PCM 255 to provide more storage performance in IOPs (IO operation per second) (via request SSD signal 285). The nature of this protocol can be simply digital rather than analog (i.e., there are several 'steps' given by an encoding where each code represents a particular ratio of acceleration vs. storage performance). In this simple example, the choices for the application 286 are as follows:

(1) one Fixed storage module+one Provisional storage module, and one Fixed Acceleration module (67% storage performance and 33% acceleration performance provided by the PE 210), or (2) one Fixed storage module, and one Fixed Acceleration module+1 Provisional Acceleration module (33% storage performance and 67% acceleration performance provided by the PE 210).

In an embodiment of the invention, the application 286 is software running on a host (wherein the host communicates with the multi-mode device 210) or is software running on-board (embedded in the multi-mode device 210), and can dynamically configure the multi-mode device 210 for different levels of storage or hardware acceleration, as similarly disclosed in the above examples.

As another example, the multi-mode device 210 can also be configured as only as a pure storage device (i.e., complete storage device) (e.g., device with approximately 100% storage performance) or a pure (or complete) acceleration device (e.g., device with approximately 100% acceleration performance). Therefore, it is not necessary that a given multi-mode device 210 has both storage and acceleration ability all the time. A given multi-mode device 210 may be completely reconfigured with storage functionality, completely reconfigured as an accelerator, or reconfigured as having both storage functionality and hardware acceleration in the device. The configuration of a given multi-mode device 210 can be performed from (can be enabled from) a host that communicates with the multi-mode device 210, can be performed from an embedded firmware, or can be performed from the device hardware (on-chip or on-board).

The application 286 (e.g., an external software) can turn on and off provisional storage and acceleration modules for any reasons such as, for example, meeting power and/or QoS (Quality of Service) requirements.

The PCM 255 ensures that the overall power is under specification by shutting off unused modules (storage modules such as e.g., ECC or flash controller modules and/or Acceleration modules). The PCM 255 also transmits the Acceleration Primary Enable signal (Accl_Primary_En) 287 and SSD Primary Enable (SSD_Primary_En) 289 to provisional Acceleration module 260*b* and provisional storage module 265*b*, respectively. The Acceleration Primary Enable signal (Accl_Primary_En) 287 and SSD Primary Enable signal (SSD_Primary_En) 289 are generated by the PCM 255 in response to the application request acceleration signal (App_Req_Accel) 280 and application request SSD signal (App_Req_SSD) 285, respectively. The Acceleration Primary Enable signal (Accl_Primary_En) 287 and SSD Primary Enable signal (SSD_Primary_En) 289 will provision the module 260*b* and 265*b*, respectively. The SSD Primary enable signal 289 also controls a selector 290 (e.g., multiplexer 290) that couples a provisioned storage module 265*b* to the media element 245(1) in order to increase the storage performance of the peripheral element (PE) 215. Note that the fixed storage module 265*a* is coupled to the media element 245(0) regardless of the mode of the peripheral element 215. Therefore, if storage module 265*b* is not provisioned, the controller element (CE) 215 still has the ability to access all storage media (e.g., ME 245(0) and ME 245(1) with just even one fixed storage module 265*a*. The selector 290 permits the fixed storage module 265*a* to access the ME 245(1) based on a logic low value of enable signal 289 that controls the switching of the selector 290. When the enable signal 289 is at a logic high value in response to the application request SSD signal 285, the selector 290 selects the provisioned storage module 265*b* (instead of the fixed storage module 265*a*) to access the ME 245(1). Therefore, the selector 290 performs swapping between the fixed storage module 265*a* and provisional storage module 265*a* so that the selector 290 selects one of the modules 265*a* and 265*b* to control the ME 245(a) in response to the value of the enable signal 289 from the PCM 255.

Therefore, the provisioned acceleration modules can be dynamically swapped with provisioned storage modules based on the mode of the peripheral device 210 (the primary mode of the peripheral device being SSD or acceleration). Regardless of the mode of the peripheral device 210, the storage media elements (ME) 245 are always accessible. The multi-mode device can be dynamically configured for load-balancing of storage performance and hardware acceleration resource by configuring at least one provisional storage module 265 and at least one provisional acceleration module 260 into desired settings (e.g., turning on or off or swapping any of the provisional storage and acceleration modules in the peripheral device 210.

In another embodiment of the invention, a system and method are provided for a highly efficient cluster of Peripheral Elements to form a group of resilient storage and acceleration (Storage-Acceleration) elements without a dedicated standby storage spare.

In a storage/compute system such as Hyperconverged Infrastructure, the direct attached drives are part of the primary storage tier too, and therefore, the direct attached drives are typically protected with raid groupings. Further, to reduce IT (information technology) intervention, the Raid-Grouping may also have a "hot" standby spare. If any drive were to fail, the spare is rebuilt. Another issue is that the spare will consume power and PCIe lanes without actually putting the spare(s) to use during normal operation.

Figure 3A:
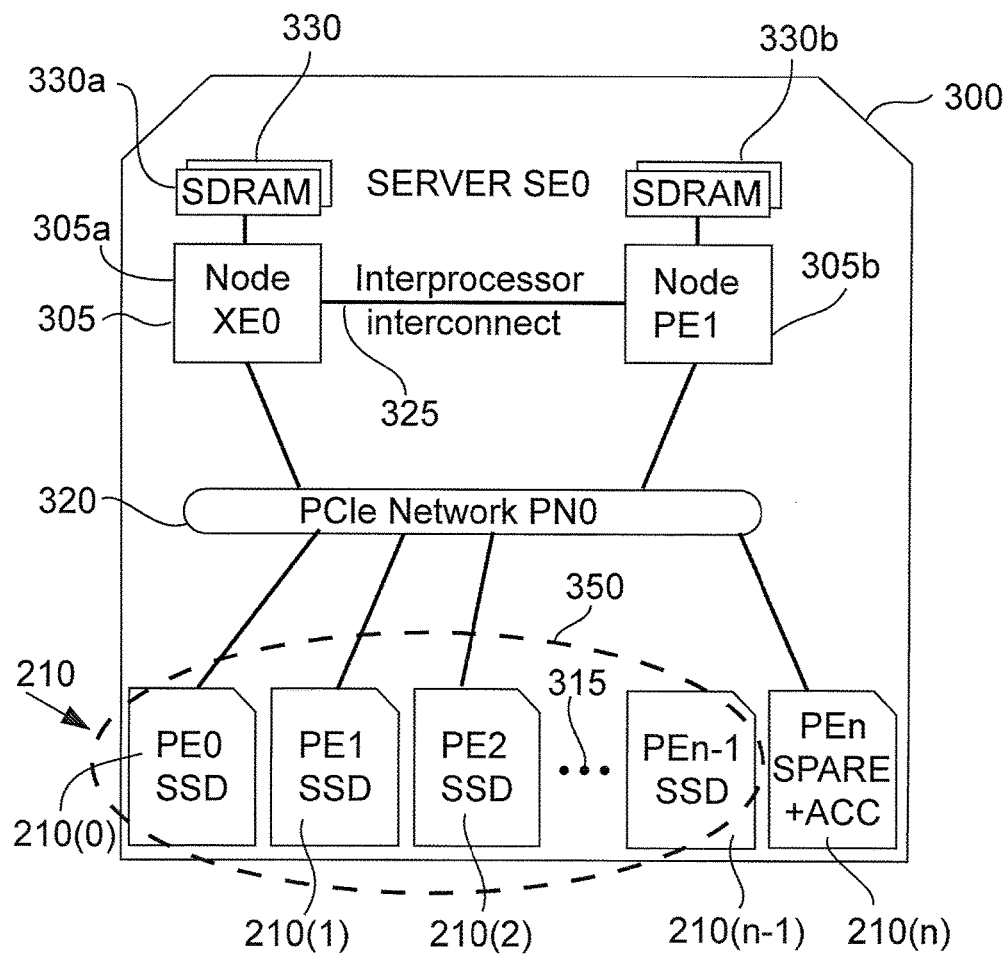
FIG. 3A is a block diagram of a cluster of peripheral elements in a normal operation in a server, in accordance with an embodiment of the invention.

In a second embodiment of the invention, a system with multi-mode devices 210 can seamlessly transform from SSD to accelerator or vice versa, thereby removing the need for a dedicated "standby" spare. Additionally, the devices 210 can transform from an SSD to a device with storage and accelerator functionalities or vice versa, and/or can transform from an accelerator to a device with storage and accelerator functionalities or vice versa, without a need for a dedicated "standby" spare. This embodiment comprises the following highly efficient system having at least the following features:

(a) For every RaidGrouping of an "n" number of PEs 210 configured as SSDs, have one additional PE (e.g., PEn 210(n) in FIG. 3A) configured as accelerator and registered as a sleeping spare (i.e., inactive spare) or write-only spare.

(b) When a PE (SSD) fails in the RaidGroup, rebuild the failure into the PE that is a registered sleeping spare. This rebuilding of the failed PE functionalities reduces the acceleration capability of the PE that is a registered sleeping spare. If the failing PE can still work as an accelerator, reconfigure the failing PE as full time accelerator. If not, then acceleration is now shared by the whole RaidGroup (e.g., RaidGroup 350) by using the configuration techniques presented above in a first embodiment of the invention, wherein a system and method are provided for a peripheral element (PE) 210 to be dynamically configured for an application's needs for storage performance and hardware acceleration.

Figure 3B:
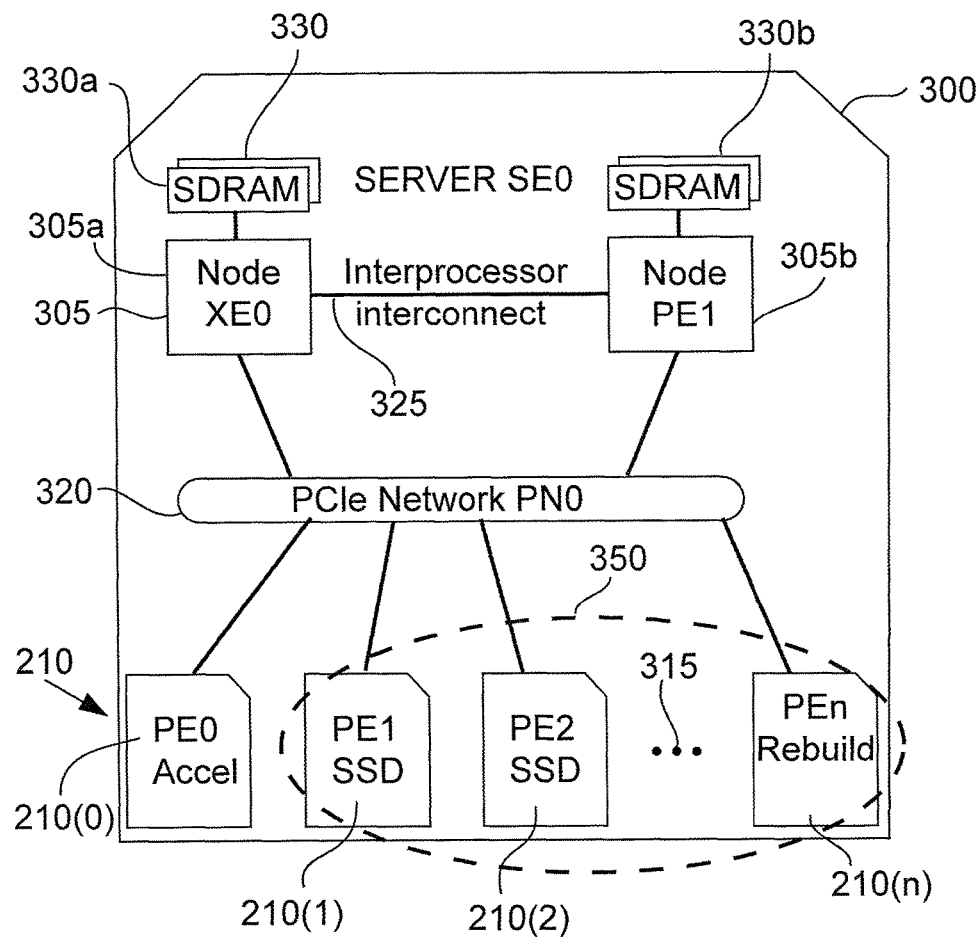
FIG. 3B is a block diagram of a cluster of peripheral elements in a server after a failure occurrence in one of the peripheral elements, in accordance with an embodiment of the invention.

Reference is now made to FIGS. 3A and 3B to illustrate a RaidGroup clustering example, in accordance with the second embodiment of the invention. The server 300 comprises at least some of the various elements that were similarly discussed above with respect to FIG. 1. For example, the server 300 comprises two CPUs 305*a* and 305*b*

(the node elements X0 and X1, respectively) connecting to a set 210 of peripheral elements PE0 210(0), PE1 210(1), PE2 210(2) through PEn-1 210(n-1) and peripheral element PEn 210(n) via a direct PCIe interconnection network (PN0) 320. The number of peripheral elements 210 (that are coupled to the interconnection network 320) may vary in number as shown by dot symbols 315. As similarly mentioned above, in server CPU architectures, this interconnection network 320 would typically be a PCIe network. The peripheral elements PEs 210 were discussed in detail above with reference to FIGS. 2A and 2B. In another embodiment, the interconnection network 320 can be, for example, another type of high performance interconnect such as Omnipath, 100 GbE, infiniband, among others.

For the server 300, part of or a whole of the network (PN0) 320 and the peripheral elements (PEs) 210 may be housed within or outside the server chassis. If the above-noted elements are outside the server chassis, they would be connected to the server chassis by external cabling (not shown in FIGS. 3A and 3B). Therefore, in any embodiment, the PEs 210 are communicatively coupled to the server 300.

The CPU nodes 305a and 305b are coupled together by an interprocessor interconnect 325. Additionally, one or more memory devices such as an SDRAM (synchronous dynamic random access memory) 330 may be coupled to a given CPU node 305. For example, one or more SDRAMs 330a are coupled to the CPU node 305a and one or more SDRAMs 330b are coupled to the CPU node 305b.

In FIG. 3A, the cluster is in normal operation where peripheral elements PE0 through PEn-1 are "n" SSDs configured as a single RaidGroup 350, wherein n is an integer value. The peripheral element (PEn) 210(n) is an additional drive configured as an accelerator. In normal operation, the server 300 comprises (n×SSD)+(1×Accelerator). Therefore, in the example of FIG. 3A, the RaidGroup 350 comprises the peripheral elements PE0 through PEn-1 wherein each the peripheral elements PE0 through PEn-1 are configured as an SSD and wherein the PEn 210(n) is configured as a spare plus accelerator. The accelerator can be in stand-by mode as an SSD or a write-only mode as SSD. For the write-only mode, only internal reads are required for garbage collection and wear levelling. Note that the write-only mode works best only for a particular kind of RAID such mirroring.

When a drive fails, such as PE0 210(0) in FIG. 3B, due to media failure (such as, for example, excessive uncorrectable errors), then PE0 210(0) is removed from the Raid-Group 350. The peripheral element (PEn) 210(n) is then added to the RaidGroup 350. Also, the peripheral element (PE0) 210(0) now switches to a full-time acceleration mode, and the peripheral element (PEn) 210(n) is added as a dedicated SSD. The above discussion with reference to the first embodiment of the invention in FIGS. 2A and 2B provide a method for provisioning and adding a peripheral element 210 to and removing a peripheral element 210 from a RaidGroup 350. Data may have to be rebuilt into the peripheral element (PEn) 210(n) if the peripheral element 210(n) was spare SSD, but the peripheral element 210(n) does not have to be rebuilt if that PEn 201(n) was previously working as a write-only spare. There is still (n×SSD)+(1× Accelerator) in the server 300. However, the system of server 300 has no standby drives and has no wasted power and has no wasted bandwidth.

As similarly discussed above, if the failing PE 210(0) can still work as an accelerator, then the system in server 300 permits reconfiguring of the failing PE 210(0) as full time accelerator. If the failing PE 210(0) can not work as an accelerator, then the system in server 300 permits acceleration to now be shared by (and distributed across) the whole RaidGroup 350 by using the configuration techniques presented above in a first embodiment of the invention, wherein a system and method are provided for a peripheral element (PE) 210 to be dynamically configured for an application's needs for storage performance and hardware acceleration. Therefore, the cluster of multi-mode devices 210 form a group of resilient Storage and Acceleration elements without a dedicated standby spare. Before failure of a PE, the cluster is formed by the grouping 350 and an additional multi-mode device 210(n) configured as accelerator and registered as an inactive spare or write-only spare. After failure of a PE, the cluster will rebuild the grouping 350 so that the cluster is formed by the grouping 350 having non-failing PEs 210 and the rebuilt multi-mode device 210(n) and a failed PE acting as an accelerator (in this example, the failed multi-mode device (PE) must have failed for storage reasons only), or the cluster will rebuild the grouping 350 so that the cluster is formed by the grouping 350 having non-failings PEs 210 and the additional multi-mode device 210(n) without the failed PE and with accelerator functions performed by and distributed among the non-failing PEs 210 in the grouping 350.

In an embodiment of the invention, if one of the multi-mode devices 210 in a grouping 350 fails, the cluster is configured to rebuild the grouping 350 by reconfiguring an accelerator device (multi-mode device 210 acting as an accelerator) or a write-only storage device (multi-mode device 210 acting as a write-only device) as a complete (i.e., pure) storage device wherein the complete storage device has limited acceleration or no acceleration. By way of example only and not by way of limitation, a completed storage device with limited acceleration is a storage device with an acceleration performance of 33% or less. Other percentage values can be configured to define a limited acceleration in a given storage device).

In third embodiment of the invention, a system and method are provided for PCIe-attached (interconnection network attached) cluster to dynamically provision full acceleration and storage resources to meet an application's needs and end-of-life requirements of an SSD. This third embodiment is a natural successor to the above-disclosed two embodiments of the invention. The first embodiment above addresses dynamic load-balancing of storage performance and acceleration resources within a PE. The second embodiment above addresses complete mode-switching from full SSD to accelerator (and vice-versa) inside a cluster.

Figure 4:
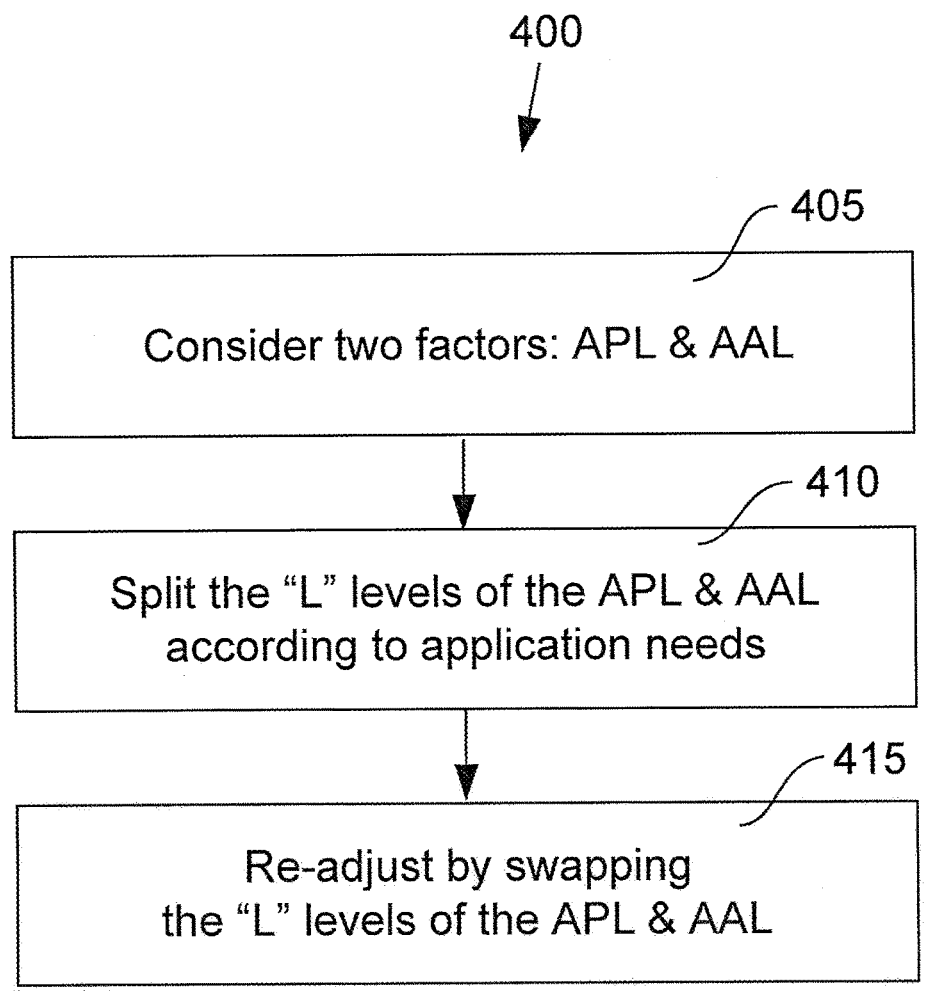
FIG. 4 is a flow diagram of a method for dynamically provisioning full acceleration and storage resources to meet an application's needs and end-of-life requirements of an SSD, in accordance with an embodiment of the invention.

FIG. 4 is a block diagram of a method 400 for dynamically provisioning full acceleration and storage resources to meet an application's needs and end-of-life requirements of an SSD, in accordance with an embodiment of the invention. In order to dynamically provision acceleration modules and storage modules, the system needs to consider two factors: Application Performance Level (APL) and Application Acceleration Level (AAL). This is shown as step 405 in FIG. 4.

The APLs and AALs are discretized by the number of provisioned storage modules (ECC module(s) or/and flash controller module(s)) (PEMs) and provisioned acceleration modules (PAMs), respectively. The levels are normalized by the size and power constraints so that each APL Level and AAL Level have the same size and power constraints.

Just as an example, APL Level0 would have zero PEMs. APL Level1 will have one PEM. AAL Level0 has zero PAMs. AAL Level1 has two PAMs, because the size of two PAMs is equivalent to 1 PEM.

Based on overall size and power constraints available, only a certain number of levels are available. For instance, a particular FPGA design can accommodate only "L" levels of the APL and AAL.

The provisioning software would then split the L levels of the APL and AAL according to application needs either through application input or automatically by monitoring the application's resource usage. This is shown as step 410 in FIG. 4. The provisioning software may be implemented, for example, as part of the software 230 (FIG. 3A) or as a separate software. For the automatic case (via monitoring), the above-mentioned two factors will start in split levels: say, e.g., L/2 levels for AAL and L/2 levels for APL. If the application is using 100% acceleration and only 40% IOPs, then the provisioning software will re-adjust by swapping the L levels APL with AAL (increase AAL level and decrease APL level or vice versa) until a balance is reached. This is shown as step 415 in FIG. 4.

So, this embodiment of the invention fills in the space where a cluster of PEs 210 used by applications such as virtualized HCI (HyperConverged Infrastructure) such as VMWare vSAN can dynamically apportion acceleration and storage resources across a direct-attached cluster of PEs 210 based on the application's needs.

This embodiment of the invention uses the same techniques discussed regarding the first embodiment and second embodiment of the invention, such as the virtual (or physical) PCM 255 (FIG. 2B) to set the mode for the various modules inside the PE 210 based on application mode, and across the cluster of PEs 210.

Embodiments of the invention have been worded mostly with "direct-attached" cluster and PCIe as the primary interface. However, any interconnect (even network-based RDMA or remote direct memory access) that provides the same functionality as given in the above-discussed features and aspects would be another embodiment of the primary interface. As an example, an omnipath-interface SSD/Hardware Accelerator will be another embodiment of an interconnect that can be used in the invention. An RDMA-based Ethernet solution will yet be another embodiment of an interconnect that can be used in the invention.

Also, only SSDs and PCIe have been discussed. Along with SSDs as storage media, any form of NVRAM will also be another embodiment. In other words, SSD in this invention encompasses all forms of non-volatile memory (including flash memory, NVRAM or non-volatile random access memory, 3D XPoint, etc.) as long as the memory type is persistent storage.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient (non-transitory) machine-readable (or non-transient (non-transitory) computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for flexible acceleration and storage provisioning, comprising:
   a multi-mode device comprising a controller element and a memory,
   wherein the controller element comprises an interface element, one or more storage elements, and one or more acceleration elements,
   wherein the one or more storage elements and the one or more acceleration elements are coupled to the interface element, and
   wherein the multi-mode device dynamically increases or decreases a ratio of acceleration performance of the one or more acceleration elements versus storage performance of the one or more storage elements in response to receiving acceleration request signals and storage request signals from an application, so that the one or more storage elements and the one or more acceleration elements are dynamically configured for load-balancing between various levels of storage functionality and hardware acceleration.

2. The apparatus of claim 1, wherein the multi-mode device comprises an FPGA (field programmable gate array) device, an ASIC (application specific integrated circuit) device, or a programmable SoC (system on a chip).

3. The apparatus of claim 1,
   wherein the one or more storage elements comprise non-volatile memory devices comprising flash memory, 3D XPoint, or MRAM (magnetoresistive random access memory), and
   wherein the one or more acceleration elements comprise DDR4 SDRAM (double data rate fourth generation synchronous dynamic random access memory) devices or high bandwidth memory devices.

4. The apparatus of claim 1, wherein the one or more storage elements and the one or more acceleration elements further comprise additional elements that are in fixed proportion instead of dynamic proportion in an ASIC (Application Specific Integrated Circuit).

5. The apparatus of claim 1, wherein software running on a host dynamically configures or software running on-board dynamically configures the multi-mode device for different levels of storage or hardware acceleration, and wherein the multi-mode device is also configured as only as a pure storage device or a pure acceleration device.

6. The apparatus of claim 1, wherein the multi-mode device is configured to provision a provisional storage module, and wherein the provisional storage module comprises an error correcting code (ECC) module or a flash controller module or a non-volatile memory controller.

7. The apparatus of claim 1, wherein the multi-mode device comprises an on-board or on-chip PCM (Power Control Module) that is able to dynamically provision storage and acceleration modules and/or turn the storage and acceleration modules on and off.

8. The apparatus of claim 1, wherein external software is able to turn on and off provisional storage and acceleration modules for any reason including meeting power and/or QoS (Quality of Service) requirements.

9. The apparatus of claim 1, wherein the a controller element accesses all storage media even if the multi-mode device has ONLY one fixed storage module.

10. The apparatus of claim 9, wherein the one fixed storage module comprises a fixed error correcting code (ECC) module or a fixed flash controller module.

11. The apparatus of claim 1, wherein the multi-mode device further comprises at least one fixed acceleration module and at least one fixed storage module.

12. The apparatus of claim 1, wherein the multi-mode device is configured to provision a provisional storage module, and
wherein the multi-mode device further comprises a selector that performs swapping between the provisional storage module and a fixed storage module so that the selector selects one of the provisional and fixed storage modules to control a media element.

13. The apparatus of claim 1, wherein the multi-mode device is able to transform from a solid state drive to an accelerator or vice versa.

14. A method for flexible acceleration and storage provisioning, the method comprising:
providing a multi-mode device comprising a controller element and a memory,
wherein the controller element comprises an interface element, one or more storage elements, and one or more acceleration elements, and
wherein the one or more storage elements and the one or more acceleration elements are coupled to the interface element, and
dynamically increasing or decreasing, by the multi-mode device, a ratio of acceleration performance of the one or more acceleration elements versus storage performance of the one or more storage elements in response to receiving acceleration request signals and storage request signals from an application, so that the one or more storage elements and the one or more acceleration elements are dynamically configured for load-balancing between various levels of storage functionality and hardware acceleration.

15. The method of claim 14, wherein the multi-mode device comprises an FPGA (field programmable gate array) device, an ASIC (application specific integrated circuit) device, or a programmable SoC (system on a chip).

16. The method of claim 14,
wherein the one or more storage elements comprise non-volatile memory devices comprising flash memory, 3D XPoint, or MRAM (magnetoresistive random access memory), and
wherein the one or more acceleration elements comprise DDR4 SDRAM (double data rate fourth generation synchronous dynamic random access memory) devices or high bandwidth memory devices.

17. The method of claim 14, wherein the one or more storage elements and the one or more acceleration elements further comprise additional elements that are in fixed proportion instead of dynamic proportion in an ASIC (Application Specific Integrated Circuit).

18. The method of claim 14, wherein software running on a host dynamically configures or software running on-board dynamically configures the multi-mode device for different levels of storage or hardware acceleration, and wherein the multi-mode device is also configured as only as a pure storage device or a pure acceleration device.

19. The method of claim 14, wherein the multi-mode device is configured to provision a provisional storage module, and
wherein the provisional storage module comprises an error correcting code (ECC) module or a flash controller module or a non-volatile memory controller.

20. The method of claim 14, wherein the multi-mode device comprises an on-board or on-chip PCM (Power Control Module) that is able to dynamically provision storage and acceleration modules and/or turn the storage and acceleration modules on and off.

21. The method of claim 14, wherein external software is able to turn on and off provisional storage and acceleration modules for any reason including meeting power and/or QoS (Quality of Service) requirements.

22. The method of claim 14, wherein the controller element accesses all storage media even if the multi-mode device has ONLY one fixed storage module.

23. The method of claim 22, wherein the one fixed storage module comprises a fixed error correcting code (ECC) module or a fixed flash controller module.

24. The method of claim 14, wherein the multi-mode device further comprises at least one fixed acceleration module and at least one fixed storage module.

25. The method of claim 14, wherein the multi-mode device is configured to provision a provisional storage module, and
wherein the multi-mode device further comprises a selector that performs swapping between the provisional storage module and a fixed storage module so that the selector selects one of the provisional and fixed storage modules to control a media element.

26. The method of claim 14, wherein the multi-mode device is able to transform from a solid state drive to an accelerator or vice versa.

27. An article of manufacture, comprising:
a non-transitory computer-readable medium having stored thereon instructions operable to permit an apparatus to perform a method for flexible acceleration and storage provisioning comprising:
providing a multi-mode device comprising a controller element and a memory,
wherein the controller element comprises an interface element, one or more storage elements, and one or more acceleration elements, and
wherein the one or more storage elements and the one or more acceleration elements are coupled to the interface element, and
dynamically increasing or decreasing, by the multi-mode device, a ratio of acceleration performance of the one or more acceleration elements versus storage performance of the one or more storage elements in response to receiving acceleration request signals and storage request signals from an application, so that the one or more storage elements and the one or more acceleration elements are dynamically configured for load-balancing between various levels of storage functionality and hardware acceleration.

28. The article of manufacture of claim 27, wherein the multi-mode device comprises an FPGA (field programmable gate array) device, an ASIC (application specific integrated circuit) device, or a programmable SoC (system on a chip).

29. The article of manufacture of claim 27,
wherein the one or more storage elements comprise non-volatile memory devices comprising flash memory, 3D XPoint, or MRAM (magnetoresistive random access memory), and
wherein the one or more acceleration elements comprise DDR4 SDRAM (double data rate fourth generation synchronous dynamic random access memory) devices or high bandwidth memory devices.

30. The article of manufacture of claim 27, wherein the one or more storage elements and the one or more acceleration elements further comprise additional elements that are in fixed proportion instead of dynamic proportion in an ASIC (Application Specific Integrated Circuit).

* * * * *